June 23, 1970    B. WARSZAWSKI    3,516,866
COMPACT FUEL CELL BATTERY
Filed Feb. 26, 1968
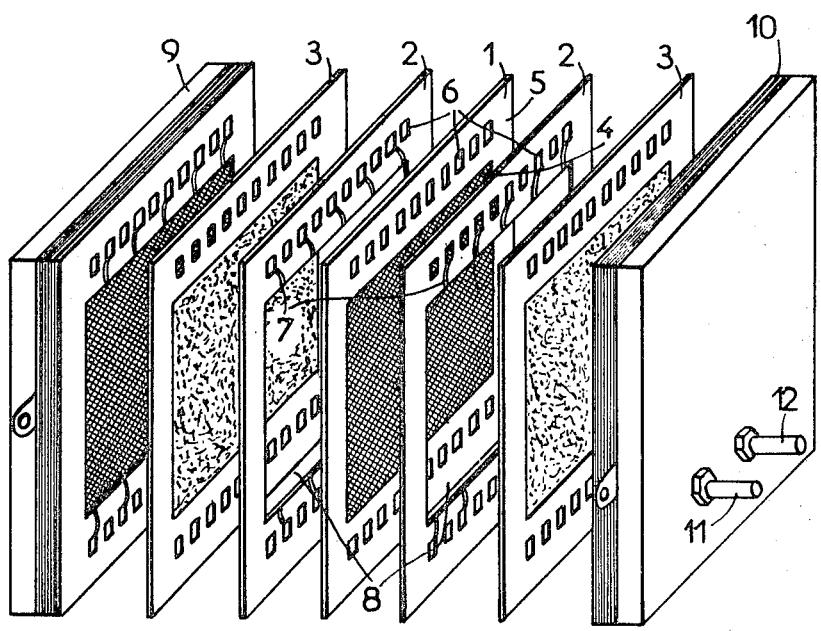
BERNARD WARSZAWSKI,
Inventor
by Stephen N. Frishauf
Atty

3,516,866
COMPACT FUEL CELL BATTERY
Bernard Warszawski, Paris, France, assignor to Societe Generale de Constructions Electriques et Mecaniques (Alsthom), Paris, France, a corporation of France
Filed Feb. 26, 1968, Ser. No. 708,444
Claims priority, application France, Feb. 24, 1967, 2,733
Int. Cl. H01v 27/26, 27/00
U.S. Cl. 136—86      2 Claims

ABSTRACT OF THE DISCLOSURE

Electrolyte which is fortified with oxidizing type and reducing type reagents, respectively, is applied to the face of stacked electrodes by forming openings in the various elements of which the battery consists (electrodes, spacer members, and semi-permeable diaphragms), which, when stacked together form supply and removal ducts for connection to electrolyte. Notches or slits connect the openings in the spacer members with a central window at locations intermediate the openings so that electrolyte applied through the ducts (formed of the stacked elements) will wash over the face of the electrodes, to be removed by similar slits communicating with other openings, forming, in the stack, a removal duct.

---

The present invention relates to fuel cells, and more particularly to stacked fuel cells, to form batteries, which are compact and are arranged for efficient supply of electrolyte to the individual half-cells of the fuel cells in the battery assembly.

Fuel cells have electrolyte, fortified with oxidizing and reducing agents, applied thereto. Such cells may consist of assembled stacks of electrode and separator elements, usually generally in sheet-form. The marginal portions of the sheet may be punched or pierced so that, when the elements are stacked together, the openings formed by the punching will provide supply and drainage ducts for the electrolytes. Openings formed in some of the elements, and extending from the punched holes towards the electrode face then permit electrolyte to pass from the conduits formed by the stacked elements to the electrode faces themselves.

One form of fuel cell consists of a pair of electrodes, divided by a semi-permeable membrane or diaphragm into two half-cells. Electrolyte fortified with oxidizing agent is applied to the space between one electrode and one face of the semi-permeable membrane, and electrolyte fortified with a reducing agent is applied to the space between the other electrode and the other face of the semi-permeable membrane. It is thus seen that the electrolytic fluid, or gas, passes across the face of the electrodes.

Good performance and results can be obtained from fuel cells of this kind. Nevertheless, it has been found that the change in flow direction, at right angles to the direction of the conduit, in a stacked assembly of a large number of such cells introduces difficulties. One such difficulty is that the separating diaphragm or membrane is exposed to pressure differentials at opposite sides of the membrane and further along the face thereof, traversed by the flow. Additionally, the membrane may be mechanically loaded and, due to its fragile nature, break under stress and become inoperative—which stress is further enhanced by the pressure differential previously referred to. Since the diaphragm, or membrane, should be permeable to liquids, to some extent, excessive interchange of the liquids causes energy loss from the battery as a whole.

An additional difficulty arises from the fact that the two streams of electrolyte, one fortified with a reducing, and the other with an oxidizing reagent, cross over at points within the battery assembly which are different, so that the extent of use, or exhaustion of the electrolyte fortified with one type of reagent may be different from that of the other. Nevertheless, the local current density, and thus the current output obtainable from any one cell, is limited by the electrolyte having the least amount of reagent concentration therein.

Another difficulty arises from the fact that the fortifying reagent added to the electrolyte will, under certain operating conditions, only be little exhausted although the cell should take more reagent from the amount of electrolyte passing the cell in order to obtain a higher power output.

It is desirable that the electrolyte pass in different directions across opposite electrodes, that is at opposite sides of the semi-permeable diaphragm. In order to provide for equal length of paths of electrolyte flow, a square shape of electrodes becomes almost a necessity, thus limiting freedom of design.

It is an object of the present invention to provide a fuel cell battery in which electrolyte may circulate freely, and in which, essentially, the disadvantages of the prior art are avoided.

SUBJECT MATTER OF THE PRESENT INVENTION

A plurality of stacked, sheet-like elements, have their openings pierced therethrough at their marginal portions. The elements are assembled so that the semi-permeable diaphragms are separated from electrodes by thin flat spacers, having a central open window. These spacers, or the faces of the electrodes, are formed with slits or notches which communicate with the openings in the marginal portions of the elements in order to provide electrolyte ducts to permit application of the electrolyte to the face of, and parallel to the planes of the sheets of the electrodes. By locating the ducts at opposite sides of the sheets, electrolyte flow will be across the entire sheets.

A series of openings or ducts, separated from each other, are preferably arranged parallel, or essentially parallel, to the edges of the sheet-like elements to form the electrolyte connection or supply ducts, which are connected to reservoirs, or supply sources for electrolyte fortified with their proper reagents. Alternate longitudinally, parallel extending supply ducts can then be connected to sources of electrolyte having alternatively different reactants added thereto; for example, the first, third, fifth, etc. duct may be supplied with electrolyte having oxidizing agents added, whereas the second, fourth, sixth, etc. duct may be connected to electrolyte having reducing agents added.

The slits, or notches, formed in the spacers in order to permit flow of electrolyte parallel to the faces of the electrodes, are preferably so arranged that they terminate at their central window (where the electrolyte will begin to contact the electrode) intermediate the location of alternate ducts so that opposite sides of the diaphragm (which will have electrolyte fortified with different types of reagents) will be substantially symmetrically loaded hydraulically.

The single figure illustrates an exploded, perspective view of a fuel cell battery.

Referring to the drawings, a battery can be constructed by repetitively stacking a large number (more than shown in the figure) of elements in this sequence: an electrode 1, which at the same time acts as a hydraulic separator between two elementary, adjacent cells, and a semi-permeable diaphragm 3, which separates two half-cells of one elementary cell.

The electrode 1 is preferably square, but it may be rectangular, round or circular. It has a central region which may be porous, of mesh form with the dimensions of the mesh being in the order of magnitudes of the thickness of the electrode material itself. The electrode may, also, consist of metallic gauze or fabric, lattice, expanded sheet metal or sheet metal embossed with protuberances or projections. In the example shown in the drawing, an embossed electrode sheet is illustrated. The electrode, at its sides, has marginal flat portions 5, and is locked between two insulating spacers or frames 2, for example of plastic, having outside dimensions which correspond to those of the marginal portions 5 of the electrode. They define and retain the electrolytic substance within the battery and insure that there is no leakage. The thickness of these frames or spacer members 2 is that of the projection of the electrode, so that each electrode is in contact with an adjacent diaphragm 3.

The insulating spacers 2, as well as the marginal portions 5 of electrodes 1, and the marginal portions of the semi-permeable diaphragms 3 are pierced on one of their sides, for example at the upper side by a group of openings 6. These openings may be rectangular, but they could be square, circular, or of any other convenient and simple form. Upon stacking electrodes, spacers, and diaphragms, the openings define parallel connecting ducts for electrolyte extending perpendicular to the plane of the sheet electrodes. The odd-numbered ducts may be, for example, supplied with electrolyte fortified with a first type of reactant, and all ducts of even order may be supplied with electrolyte fortified with another reactant. The insulating spacers 2, which separate the electrodes 1 and adjacent diaphragms 3, that is which define the outer sides of an electrolytic compartment, are furthermore formed with a group of thin slits 7, communicating a central window in the frame with alternate ones of the transverse openings and forming the electrolyte connecting ducts. The slits formed in successive spacers 2, which define the two electrolyte compartments of one elementary cell, on either side of one diaphragm 3, are connected to the transverse opening in such a manner that one group of slits is in communication with the openings supplying electrolyte with reactant of one type, whereas the other is connected with reactant of another type.

One side of the electrodes, spacers and diaphragms, may be considered the supply side; its opposite side, in the drawing the lower one, is the drainage side. The various elements forming the entire battery assembly are symmetrical, and are similarly pierced with openings to form electrolyte drainage ducts. Similarly, slits are provided in the frames and interconnecting the open window of the frame with respective ducts. It is, however, also possible for certain applications to provide as many slits as are transverse openings, that is to provide for mixing of the electrolytes from opposite sides from the semi-permeable diaphragms in the removal ducts. In accordance with another variation, the transverse openings may be of different size, that is various ones may be interconnected.

The terminal point of each slit 7 with the central window 8 of the frame is preferably arranged to be approximately intermediate the spacing of adjacent transverse openings 6, so that the slits may be slightly curved as best seen in the drawing. The final, terminal end, is preferably arranged such that the direction of flow will be transverse to the inner edge of the frame, that is straight down and across the face of the electrodes and the diaphragm and perpendicular to the vertical, longitudinal side, as seen in the drawings.

The central portion 4 and the marginal portion 5 of the electrodes are preferably one single, unitary sheet, the central portion 4 being shaped, for example by embossing, and forming a thin, conductive sheet. According to an alternative structure, the central, electrode portion can be made of a material different and separate from the marginal portion 5, and joined thereto.

The marginal portion 5 may also be covered with an insulating material such as an insulating lacquer.

By repetitively stacking the elementary half-cells comprising the elements electrode 1, frame 2, and diaphragm 3, as best seen in the partly exploded view of the drawing, elementary fuel cells will be grouped in a unique assembly. The entire, stacked battery is locked together, for example, by bolts and nuts (not shown) between two terminal plates 9, 10. Electrolyte supply stubs 11, 12, are connected to plate 9, the electrolyte removal stubs not being shown. Each supply stub is connected to the distribution ducts within the battery, by a distribution plate, or channel, or grooves within the end plates 9, 10 (not shown) and as well known in the art.

A complete fuel cell further includes certain elements not shown and not material to the present invention: means to provide an emulsion, a reducing, or oxidizing agent, respectively, in electrolyte, or into a portion thereof, means to circulate the electrolyte through the assembled battery (for example, including pumps), and duct and piping means to interconnect the pumps, supply sources and the battery. Additionally, means may be provided to extract spent electrolyte, to remove reaction products, and heating radiation fins to remove heat arising during operaion of the battery. The electrolytic fluid itself may act as a cooling fluid and may be connected through a heat exchanger after having been removed from the cell. The electrolytic circuit may be open, in which case a reserve of electrolytic fluid will be necessary, or it may be closed, in which case the electrolytes, or portions thereof, will be recycled after having been recharged with the proper reactants.

Various structural changes and modifications, as determined by the requirements of particular applications or uses, may be made without departing from the inventive concept.

I claim:

1. Fuel cell battery formed with a plurality of stacked, thin sheet-like elements including electrode elements and semi-permeable diaphragms, and separator frames located between said electrode elements and said diaphragms, said elements having a central window to receive central portions of the electrode to be activated by electrolyte;

said elements having openings pierced therethrough at their marginal portions, said openings, upon stacking said elements forming connecting ducts extending perpendicularly to the plane of the thin sheets, for supply and removal of electrolyte fortified with reagents, and electrolyte ducts formed in said plates connected in said openings to provide for application and removal of electrolyte from the face of, and parallel to the plane of the thin sheets, said openings being located in groups along at least one edge portion of said sheet-like elements, separated from each other, to form at least a pair of groups arranged essentially parallel to the edge of said edge portion;

slits formed in said frame and extending to connect the central window with said pierced openings;

the slits in the frames located at opposite sides of said electrode elements connecting alternate ducts to said window whereby electrolyte fortified with different type reagents will be applied to opposite sides of said electrode elements;

the junction of the slit and the central window of said frames being located intermediate the location of adjacent openings in said frames;

and means connecting alternate connecting ducts formed by said openings to electrolyte, respectively, fortified with different type reagents to form said two groups.

2. Battery according to claim 1, wherein the slits extend into the central window in a direction perpendicular to the edge of the window.

References Cited

UNITED STATES PATENTS 3,278,336  10/1966  Uline et al. _____ 136—86

FOREIGN PATENTS 1,399,765  4/1965  France.

ALLEN B. CURTIS, Primary Examiner